United States Patent
Samadani et al.

(10) Patent No.: US 7,526,718 B2
(45) Date of Patent: Apr. 28, 2009

(54) APPARATUS AND METHOD FOR RECORDING "PATH-ENHANCED" MULTIMEDIA

(75) Inventors: Ramin Samadani, Menlo Park, CA (US); Michael Harville, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1088 days.

(21) Appl. No.: 10/427,614

(22) Filed: Apr. 30, 2003

(65) Prior Publication Data

US 2004/0218895 A1    Nov. 4, 2004

(51) Int. Cl.
*G06F 17/24*    (2006.01)

(52) U.S. Cl. .................. 715/201; 715/202; 715/203; 715/204; 715/205; 342/357.06; 342/357.08; 342/357.13

(58) Field of Classification Search ............... 715/500.1, 715/201, 202–205; 342/357.13, 357.06, 342/357.08
See application file for complete search history.

(56) References Cited

U.S. PATENT DOCUMENTS

| | | | |
|---|---|---|---|
| 5,296,884 A | 3/1994 | Honda et al. | |
| 5,422,814 A | 6/1995 | Sprague et al. | |
| 5,596,494 A | 1/1997 | Kuo | |
| 5,613,055 A | 3/1997 | Shimoura et al. | |
| 5,642,285 A | 6/1997 | Woo et al. | |
| 5,684,937 A | 11/1997 | Oxaal | |
| 5,712,899 A | 1/1998 | Pace, II | |
| 5,726,660 A | 3/1998 | Purdy et al. | |
| 5,864,632 A | 1/1999 | Ogawa et al. | |
| 5,867,804 A | 2/1999 | Pilley et al. | |
| 5,926,116 A | 7/1999 | Kitano et al. | |
| 5,945,985 A * | 8/1999 | Babin et al. | ............... 715/500.1 |
| 5,948,040 A | 9/1999 | DeLorme et al. | |
| 5,999,124 A | 12/1999 | Sheynblat | |
| 5,999,882 A | 12/1999 | Simpson et al. | |
| 6,008,808 A | 12/1999 | Almeida et al. | |
| 6,018,697 A | 1/2000 | Morimoto et al. | |
| 6,023,278 A | 2/2000 | Margolin | |

(Continued)

FOREIGN PATENT DOCUMENTS

EP    1054331    11/2000

(Continued)

OTHER PUBLICATIONS

MediaMapper Multimedia Map Creator, MediaMapper.com, last updated Jan. 24, 2002, pp. 1-12.*

(Continued)

*Primary Examiner*—Joshua D Campbell (57) ABSTRACT

A "path-enhanced" recorder combines the recording of multimedia data files (typically, but not necessarily, using conventional digital audio, photo, and video recording technology), along with quasi-continuous capturing of time and position data to permit a subsequent reconstruction of the user's entire path, preferably including times and/or locations at which no multimedia data files were being recorded. A "path-enhanced" recorder device thus provides a combined record of not only multimedia data files but also data concerning path traveled between (and possibly during) the capturing of individual recorded media files to thereby create "path-enhanced" multimedia, which in turn facilitates a number of contemplated applications including the Automatic Generation of Presentations; Exploration, Enhancement and Editing of "Path-Enhanced" Multimedia; and Searching of "Path-Enhanced" Multimedia Databases.

44 Claims, 4 Drawing Sheets

U.S. PATENT DOCUMENTS

| | | | |
|---|---|---|---|
| 6,088,654 | A | 7/2000 | Lepere et al. |
| 6,139,433 | A | 10/2000 | Miyamoto et al. |
| 6,144,375 | A | 11/2000 | Jain et al. |
| 6,148,260 | A | 11/2000 | Musk et al. |
| 6,173,239 | B1 | 1/2001 | Ellenby |
| 6,182,010 | B1 | 1/2001 | Berstis |
| 6,195,122 | B1 | 2/2001 | Vincent |
| 6,282,362 | B1 | 8/2001 | Murthey et al. |
| 6,285,317 | B1 | 9/2001 | Ong |
| 6,288,704 | B1 | 9/2001 | Flack et al. |
| 6,317,690 | B1 | 11/2001 | Gia |
| 6,321,158 | B1 | 11/2001 | DeLorme et al. |
| 6,337,688 | B1 | 1/2002 | Berstis |
| 6,360,168 | B1 | 3/2002 | Shimabara |
| 6,504,571 | B1 | 1/2003 | Narayanaswami et al. |
| 6,564,263 | B1 | 5/2003 | Bergman et al. |
| 6,611,753 | B1 | 8/2003 | Millington |
| 6,636,803 | B1 | 10/2003 | Hartz et al. |
| 6,683,609 | B1 | 1/2004 | Baron et al. |
| 6,895,310 | B1 | 5/2005 | Kolls |
| 6,903,763 | B1 | 6/2005 | Noguchi et al. |
| 6,904,160 | B2 | 6/2005 | Burgess |
| 7,239,760 | B2 | 7/2007 | DiBernardo et al. |
| 2001/0022621 | A1 | 9/2001 | Squibbs |
| 2001/0023390 | A1 | 9/2001 | Gia |
| 2002/0010543 | A1 | 1/2002 | Watanabe et al. |
| 2002/0011951 | A1* | 1/2002 | Pepin et al. ............ 342/357.13 |
| 2003/0024975 | A1 | 2/2003 | Rajasekharan |
| 2004/0041999 | A1 | 3/2004 | Hogan et al. |
| 2004/0061726 | A1 | 4/2004 | Dunn et al. |
| 2005/0012743 | A1 | 1/2005 | Kapler et al. |

FOREIGN PATENT DOCUMENTS

| | | |
|---|---|---|
| EP | 1128284 | 8/2001 |
| EP | 1133150 | 9/2001 |
| EP | 1139116 | 10/2001 |
| EP | 1139681 | 10/2001 |
| EP | 1146467 | 10/2001 |
| EP | 1158822 | 11/2001 |
| WO | WO9821688 | 5/1998 |
| WO | WO9854896 | 12/1998 |
| WO | WO9918732 | 4/1999 |
| WO | WO0072577 | 11/2000 |
| WO | WO0144978 | 6/2001 |
| WO | WO0154021 | 7/2001 |
| WO | WO0163479 | 8/2001 |
| WO | WO0233955 | 4/2002 |

OTHER PUBLICATIONS

Qualcomm and Autotrac of Brazil Join to Bring OmniTRACS Mobile Information Management System to Argentina, PR Newswire, New York, Aug. 24, 1999, pp. 1-3.*

Hewlett Packard: "MediaBeads: An Architecture for Path-Enhanced Media Applications" www.hpl.hp.com, online! Jun. 30, 2004, XP002304362 Taipei, TW.

Alison Brown, Navsys Cooporation: "Smart Camera for Precise Mapping and Targeting" www.nasatech.com, online! Sep. 1998, XP002304364.

www.afds.net: "Red Hen Systems, Inc-Media Mapper" www.afds.net, online! Oct. 28, 2004, XP002304366.

J K Berry, K Burgess: "Practical Applicaitons of Video Mapping in Natural Resources" Geo World, online! Jul. 4, 2002, XP002304367.

XeQute Softare: "Smart Pix Manager v. 6.0" Internet Article, online! Nov. 27, 2002, XP002304363.

BK Smith et al: "Inquiry with Imagery: Historical Archive Retrieval with Digital Cameras" www.media.mit.edu, online! 1999 XP002304365.

http://www.nikon-image.com/ebg/news_release/2001/d1xhnr.pdf.

Kolojejchick et al., Information appliances and tools in Visage, Computer graphics and Applications, Jul.-Aug. 1997, IEEE vol. 17, Issue 4, pp. 32-41.

What visage-Link can do, Http://www.maya.com/visage/link/shar_reg.html, 1997.

Smith et al, Geographic Information Systems and Libraries: Patrons, Maps, and Spatial Information, Papers presented at the 1995 Clinic on Library Applications of Data Process.

Smith, T.R., A Digital Library for Geographically Referenced Materials, IEEE Computer, 1996, pp. 54-60.

Christel et al. "Interactive Maps for a Digital Video Library," IEEE Multimedia, 2000, pp. 60-67.

* cited by examiner

Fig. 5

APPARATUS AND METHOD FOR RECORDING "PATH-ENHANCED" MULTIMEDIA

CROSS-REFERENCE TO RELATED APPLICATIONS

Several commonly assigned patent applications filed concurrently herewith describe various contemplated applications for the present apparatus and methodology, and each of the following identified patent applications is hereby incorporated by reference in its entirety:

Ser. No. 10/427,582 "Automatic Generation of Presentations from "Path-Enhanced" Multimedia" relates to apparatus and methodology for generating a presentation of multiple recorded events together with an animated path-oriented overview connecting those events.

Ser. No. 10/427,649 "Exploration, Enhancement and Editing of "Path-Enhanced" Multimedia" relates to a display apparatus and method which uses a path derived from spatial and temporal relationships to explore, enhance and edit a sequence of text, sounds, still images, video and/or other "multimedia" data. Moreover, the data defining any such associated path may also be edited to thereby define a new or modified path.

Ser. No. 10/427,647 "Indexed Database Structures and Methods for Searching Path-Enhanced Multimedia" relates to database structures and data searching procedures for recorded data having associated times and locations.

1 Field of the Invention

The present invention relates generally to recording devices and more specifically to devices for capturing "multimedia" (as defined herein) together with any associated time and/or location data.

2 Background

A number of consumer-oriented electronic recording devices are currently available which combine sound, still image and video camera capabilities in an easy to use format, in which the captured data is optionally time-stamped with a self-contained clock. Some available consumer multimedia recording devices permit the separate recording of text captions and spoken narratives. Recording devices have also been proposed which use GPS technology to identify the exact time and location that a particular sound or image was recorded.

BASIC CONCEPTS AND DEFINITIONS

Multimedia

Although "multimedia" has been variously used in other contexts to refer to data, to a sensory experience, or to the technology used to render the experience from the data, as used herein it broadly refers to any data that can be rendered by a compatible machine into a form that can be experienced by one or more human senses, such as sight, hearing, or smell. Similarly, although "multimedia" has been used elsewhere specifically in connection with the presentation of multiple sensory experiences from multiple data sources, as used herein it is intended to be equally applicable to data representative of but a single sensory experience. Common examples of such multimedia include data originally captured by physical sensors, such as visible or IR images recorded by photographic film or a CCD array, or sounds recorded by a microphone, or a printed publication that has been microfilmed or digitized. Other currently contemplated examples include data that is completely synthesized by a computer, as for example a simulated flight in space, digital text (such as ASCII or UNICODE) that can be rendered either as a page of text or as computer generated speech, or data representative of certain physical properties (such as color, size, shape, location, spatial orientation, velocity, weight, surface texture, density, elasticity, temperature, humidity, or chemical composition) of a real or imaginary object or environment that could be used to synthesize a replica of that object or environment. Multimedia data is typically stored in one or more "multimedia files", each such file typically being in a defined digital format.

Location

Location may be defined in terms of coordinates, typically representative of the user's position on the Earth's surface. Many coordinate systems are commonly used in celestial mechanics and there are known transformations between the different coordinate systems. Most coordinate systems of practical interest will be Earth centered, Earth-fixed (ECEF) coordinate systems. In ECEF coordinate systems the origin will be the center of the Earth, and the coordinate system is fixed to the Earth. It is common to model the Earth's shape as an ellipsoid of revolution, in particular an oblate spheroid; the Earth being larger at the equator than at the poles, and the World Geodetic System 1984 (WGS84) is an example of such a coordinate system commonly used in GPS applications. Within the WGS84 system, latitude and longitude will define any location on the Earth's surface. Any other generalized coordinate system, instead of latitude and longitude, defined on the ellipsoid, could be used to reference locations on the Earth. For some applications, a third coordinate, altitude will also be required. In GPS applications, altitude typically measures the distance not above the actual terrain, but above (or below) the aforementioned oblate spheroid representation of the Earth. In other applications, location could be represented in a one-dimensional coordinate system, corresponding for example to mileposts or stations (or even scheduled time) along a predetermined route.

Time

Similar to location, there are many methods for representing time. In many data processing applications, time is defined as the numerical representation of the time difference between the current time and an absolute reference time using some time scale. Local time may be calculated from this numerical representation by using additional latitude and longitude information.

Coordinated Universal Time (UTC) is a modern time scale that serves as an example of the time scale used in these inventions. The UTC time scale defines a very steady second and it is also tied to the earth's rotation. The second is defined in terms of the duration of a given number of periods of the radiation produced by the atomic transitions between two hyperfine levels of the ground state of cesium-133. In addition, the UTC system is synchronized to drifts in speed of the Earth's rotation by the addition of leap seconds.

Path

As used herein, "path" means an ordered sequence of adjacent locations (from GPS or otherwise; it may include latitude, longitude and/or altitude) each having an associated sequential time stamp (typically from GPS, from other wireless services, and/or from an internal clock or counter).

Equivalently, a "path" may be thought of as a sequence of time data, each associated with a respective location from a sequence of locations.

"Path-Enhanced" Multimedia (PEM)

The association of path information (e.g., time and location data) and multimedia generates "path-enhanced" multimedia. Path information is recorded for the path traveled between and during the recording of the individual recorded multimedia files. In other words, the path information includes path times and locations at which multimedia was and was not recorded. Note that one multimedia file associated with a given point on a path can correspond to more than a single instant of time, and that more than one multimedia file can be associated with the same point.

BRIEF SUMMARY OF THE INVENTION

A "path-enhanced" recorder combines the recording of multimedia data and associated path information (e.g., time and location data). The "path-enhanced" recording device thereby provides a record not only of multimedia data but also of information (e.g., time and location data) concerning one or more paths traveled between (and possibly during) the recording of individual media data. The association of the path information and multimedia data thereby generates "path-enhanced" multimedia, which facilitate a number of contemplated uses discussed both herein and in the referenced co-pending applications.

The invention is defined in the appended claims, some of which may be directed to some or all of the broader aspects of the invention set forth above, while other claims may be directed to specific novel and advantageous features and combinations of features that will be apparent from the Detailed Description that follows.

DETAILED DESCRIPTION OF EXEMPLARY EMBODIMENT(S)

Figure 1:
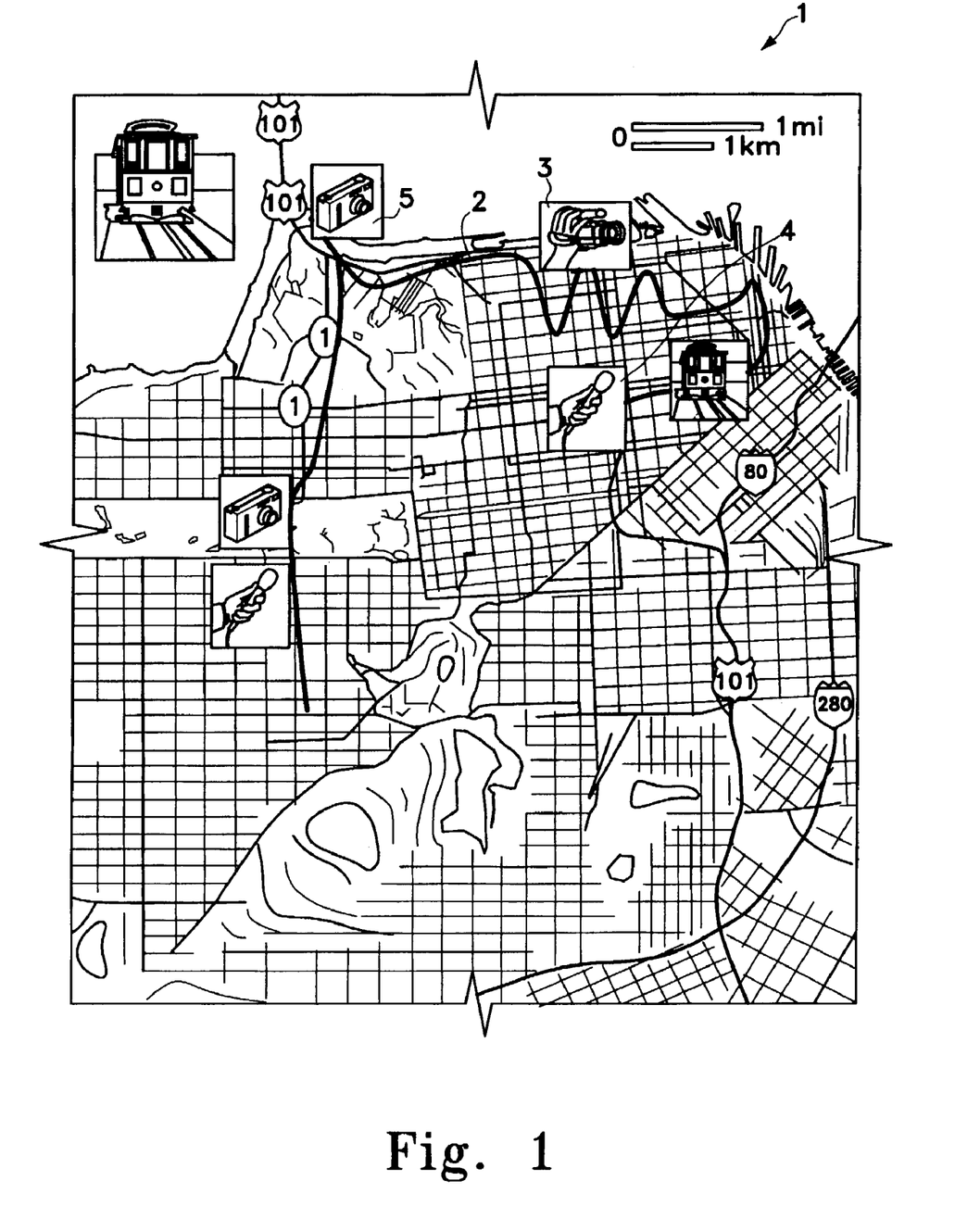
FIG. 1 illustrates an exemplary application of "path-enhanced" multimedia.

FIG. 1 illustrates an example of a map 1 of a city (e.g., San Francisco) that can be rendered from "path-enhanced" multimedia obtained with a "path-enhanced" multimedia recorder. Specifically, since "path-enhanced" multimedia includes path information associated with recorded multimedia data, a map can be rendered showing the position of given recorded multimedia along a given path. As shown by map 1, a visitor to San Francisco may follow a route (Path 2) and use a "path-enhanced" multimedia recorder to capture various multimedia files (represented by multimedia icons Video 3, Sound 4, Photo 5) along Path 2, thereby creating a multimedia diary of his travels or touring experience that includes not only the individual multimedia files 3, 4, 5, but also the path 2. The "path-enhanced" multimedia recorder can also be used to collect and organize information in a diverse array of other contemplated applications, including geological or biological scientific exploration expeditions, military reconnaissance missions, information-gathering by news reporting teams working on a story, evidence documentation by law enforcement officials or private investigators working on a case, building site analysis by surveyors or construction workers, and the creation of map-based presentations of prospective homes for sale.

Figure 2:
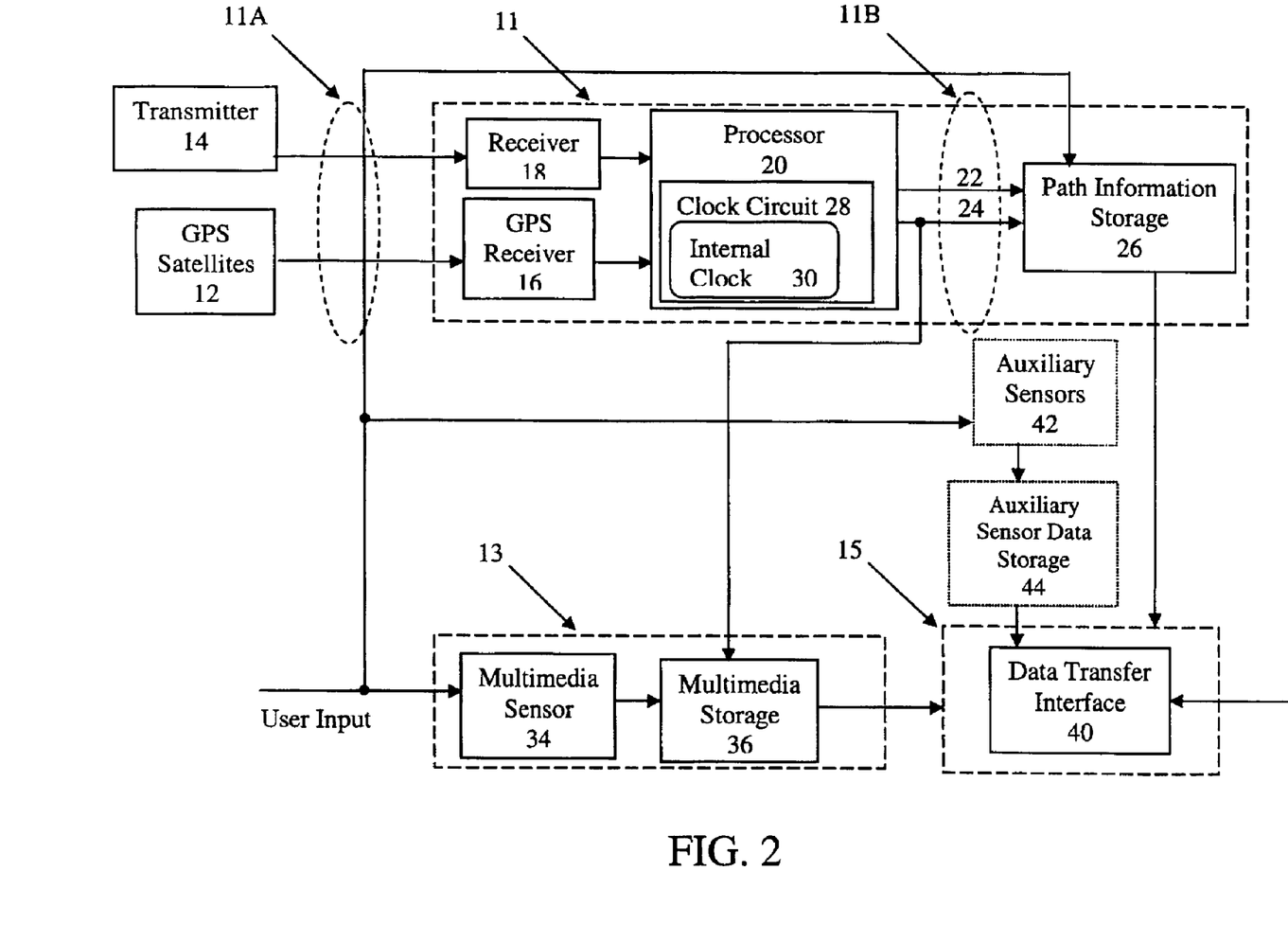
FIG. 2 is a schematic block diagram of an exemplary "path-enhanced" multimedia recorder.

FIG. 2 shows an exemplary embodiment of a "path-enhanced" multi-media recorder 10 including a path-determining subsystem 11, a multimedia recording subsystem 13, and a data transfer subsystem 15. As shown in this embodiment, the path-determining subsystem 11 receives path-determining information 11A. In some embodiments, more than one signal corresponding to path-determining information from more than one source can be received. It should be noted that the path-determining information includes at least information relating to location of the recorder 10 along the path but may or may not include time information relating to the path. Path location and path time data 11B (i.e., path information including location data 22 and time data 24) are determined from at least the path-determining information and are stored thereby constituting the recording of path information. The storing of the location and time data 11B effectively associates each pair of stored location and time data 11B with a given point along the path. In other embodiments, location and time data 11B may be associated or linked with a given point along a path directly or indirectly. In the embodiment shown in FIG. 2, path information is recorded when location and time data 11B is stored in path information storage 26.

Path information, including at least time data (e.g., time data 24), is provided to the multimedia recording subsystem 13. Subsystem 13 records multimedia data and associates at least a portion of the recorded data to the path information. It should be understood that for purposes of the subject application, recording of multimedia data refers to the capture and storage of the multimedia data. In one embodiment, subsystem 13 includes multimedia sensor 34. Sensor 34 can be embodied to capture at least audio signals, still or video images, and text character input. Sensors 34 may capture at least one of analog or digital multimedia signals. Sensor 34 can be embodied as at least one of an audio microphone, a still image capture device (e.g., a camera), a video image capture device (e.g., a video recorder), and text capture device (e.g. a keyboard, or a touch-screen and stylus). In the embodiment shown in FIG. 2, the captured multimedia data is stored by multimedia storage 36. Path information is associated with the stored multimedia data either by storing the path information with the multimedia data or by linking the path information in some way to the stored multimedia data.

The data transfer subsystem 15 allows for the transferring of the "path-enhanced" multimedia data, which includes multimedia data and associated path information. In general, the data transfer subsystem 15 can function to format the "path-enhanced" multimedia data as well as provide an I/O interface to allow communication between the recorder 10 and an external device. The data transfer subsystem may also include a transmitter, such as an infrared transmitter or wireless transmitter. Furthermore, data transfer subsystem 15 may also include a port for coupling additional modules adapted to receive the "path-enhanced" multimedia data. Hence, the data transfer subsystem 15 allows for subsequent external processing (e.g., enhancement, editing, viewing, archiving, etc.) of the "path-enhanced" multimedia data.

In one embodiment of the recorder 10, the path-determining subsystem 11 includes receiver 18, GPS receiver 16, processor 20, path information storage 26, clock circuit 28, and internal clock 30. It should be understood that other embodiments of the recorder 10 may include more or less of these elements. According to this embodiment, recorder 10 receives path-determining information 11A from either (or both) GPS satellites 12 and/or other sources 14, via respective compatible receivers 16,18. In general, path-determining information 11A are considered "raw" data signals in that these signals often require further processing to obtain location and time data 11B. The GPS receiver components 16 of "path-enhanced" recorder 10 may be made from ICs from such companies as Sirf Technologies, Motorola and Valence Semiconductors. It is current practice for consumer GPS receivers to have a radio frequency analog processing front-end circuit, and then, in a separate IC, digital correlator circuits that demodulate the spread spectrum signals the GPS satellites deliver. Internal to the GPS receivers are two digital phase locked loops, one tracking the code phases (compared to internally generated pseudo-random codewords), and one tracking the carrier phase of the satellite L1 microwave band signal. Hybrid components employing both analog and digital signal processes might be particularly suitable for implementing GPS receivers, with analog circuitry for the radio frequency front-end and digital circuitry for the correlators.

Transmitter 14 and receiver 18 allow location systems additional to or complementary to GPS to be used for providing location and, optionally, time information. For example, transmitter 14 can optionally send other information that may be used for location calculations performed by processor 20. In addition, compatible receiver 18 may represent a radio frequency (RF) receiver for an independent indoor location system, or it may represent a differential GPS receiver that receives GPS correction information for improved accuracy. Receiver 18 may also record the cellular phone base station signals of Qualcomm's SnapTrack technology, which can then be used to augment the GPS signal to provide improved location measurements in indoor environments. Location information may also be obtained from known triangulation methodology, based on transmission delays to known locations of radio transceivers. This alternative or supplemental location information determining technology may be used to further refine the location data 22 calculated from GPS information or for determining location data 22 when GPS signals are not available (such as in some indoor locations). If path-determining information 11A from multiple location systems are available to the device at the same time, the device can give greater weight and emphasis to the location system or systems that are operating most accurately or reliably.

Processor 20 can provide logic for aligning the spatiotemporal coordinate systems used by the different sources of location and/or time information. Processor 20 also can provide logic for switching the source of the location and/or time information from one system to the other (16,18) as each becomes more or less reliable and accurate. Optionally, Processor 20 may combine the location information from the different sources (12,14) with weights that represent the accuracy expected from the respective locating systems (e.g. indoors, the GPS weight would be zero).

Processor 20 can also include an interpolation procedure to provide an estimated location when the device is in a location where its receivers 16,18 cannot receive a reliable signal. In some embodiments, the device also contains accelerometers whose measurements may be used, in combination with a clock signal from an internal clock, to compute spatial displacements of the device. In the absence of reliable signals from receivers 16,18, these displacements may be added to the last reliable receiver-based location measurement in order to obtain an estimate of a current location.

For those applications that require accurate paths but that do not require real-time computation, a possible technique for generating the location and time data 11B is to first store "raw" signals (i.e., path-determining information 11A) and later "post-process" them to obtain the times and locations. Satellite ephemeris and complex, accurate ionospheric error models are available only sometime after the data is gathered. Using the ancillary data results in the increased accuracy of the "post-processed" "raw" data. Different post-processing approaches are possible for received GPS signals. In a first approach, the raw GPS waveform is digitized and stored. Later, software computations that combine the raw GPS waveforms and the improved ancillary data are used to generate an accurate path. In a second approach, GPS pseudo-range data (GPS range calculations that do not correct for receiver clock bias errors) is stored at the receiver. This pseudo-range data is later processed together with the ancillary data to generate the location and time data 11B. The approach based on raw GPS waveforms provides the maximum flexibility at the cost of increased required storage. In both approaches, any GPS data recorded prior to post-processing is preferably synchronized with any recorded multimedia via a counter-based scheme. The post-processing allows these counters to be replaced with accurate time measurements.

In the depicted exemplary embodiment, the path time data 24 is determined by processor 20. In one embodiment, the time data 24 is derived by clock circuit 28 from GPS signals (including a "GPS signal detect" signal and a "GPS computed time" signal) provided from the GPS receiver 16. The time data 24 may be synchronized with an internal clock 30 within clock circuit 28 such that when no GPS or external timing information is available from path-determining information 11A, the internal clock 30 may be used to provide the path time data 24. In one embodiment, internal clock 30 is implemented with a crystal oscillator.

The path time data 24 determined by processor 20 is output to the path information storage 26. In general, the location data 22 generated by processing path-determining information 11A is more or less continuously determined and sampled from processor 20 and stored along with the time data 24 in the path information storage 26 such that path information is recorded on an essentially continuous basis regardless of whether multimedia data is recorded or not. More specifically, path information is recorded for the path traveled between and during the capturing of individual recorded media files. In other words, the path information includes path times and locations at which multimedia was and was not recorded. It should be noted that to save power and storage, the path-sampling rate can be determined adaptively, based on whether or not the recorder 10 is actually moving, and/or whether or not the recorder 10 is presently recording multimedia.

In other embodiments, especially when user privacy considerations are paramount or when the recorded multimedia data is intended to be associated with a location and time that is not the actual location and time at which the multimedia data was originally captured, it may be desirable not to record actual time 24 or location 22 data associated with a path, but only sequential reference numbers. These sequential reference numbers can be subsequently converted into a sequence of events associated with possibly fictitious times and locations on a possibly fictitious (or "virtual") path.

The path time data 24 is also provided to the multimedia storage 36 in order to associate path information (e.g., time data 24) with recorded multimedia data. It should be noted that although, as shown, the path information and multimedia data are stored separately in respective stores 26, 36 each appropriately time-stamped with time data 24, those skilled in the art will realize that other means are possible for providing an unambiguous association between a particular multimedia data file and a particular location on a path associated with that file. In particular, if conventional recording formats are used for the multimedia that do not explicitly provide for storage of an absolute time of recording, the path association may be implemented by a suitable pointer from the path data to the multimedia data.

Data Transfer interface 40 combines the path information from path storage 26, the multimedia data from multimedia storage 36, and possibly also auxiliary sensor information from the optional auxiliary sensor data storage 44 (to be described in further detail herein), to provide a "path-enhanced" multimedia output 38 which can be subsequently processed (e.g., edited, displayed, shared, and/or archived). In other embodiments, interface 40 may also implement encryption of the output data, if desired by the user. It should be noted that, the format used internally within recorder 10 need not necessarily be the same format as appears on I/O output 38 to an external subsystem (not shown), with data interface 40 optionally providing for any required format conversion between the internally stored data and the external subsystem.

Recorder 10 may optionally include one or more auxiliary sensors 42 and an auxiliary sensor data storage 44. The auxiliary sensors may include, for example, a built-in compass and inclinometer for determining the device's orientation (heading and tilt), and/or an altimeter and/or accelerometer, and/or environmental condition sensors such as a thermometer and barometer. The auxiliary sensors capture raw location-related data that can be used to supplement the external locationing systems exemplified by transmitter 14 and satellite 12. Any such auxiliary sensor data is provided to auxiliary sensor data storage 44, together with the previously mentioned time data 24 from processor 20.

Figure 3:
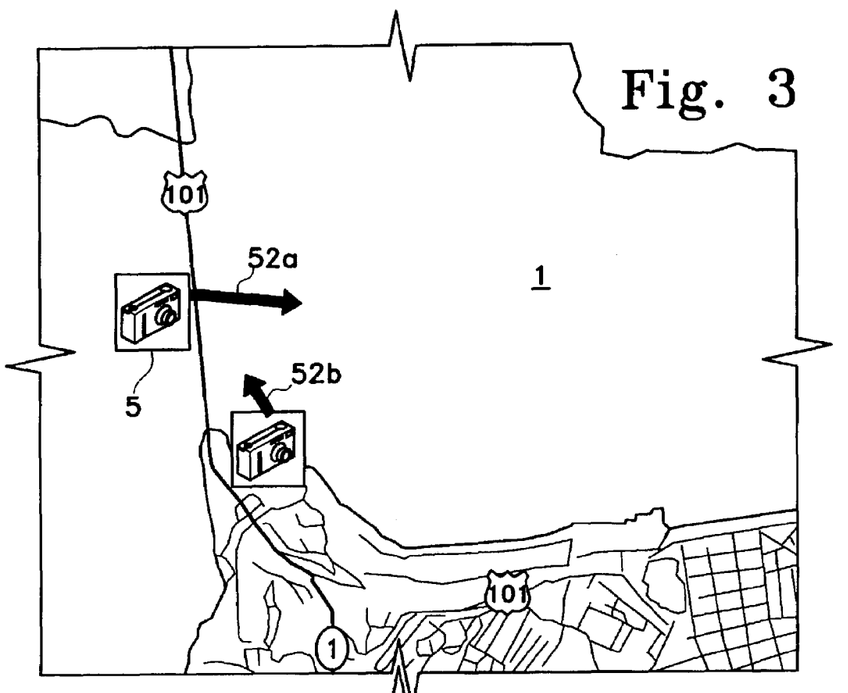
FIG. 3 illustrates another exemplary application of "path enhanced" multimedia which is supplemented by "field-of-view" data derived from one or more auxiliary sensors included in the recorder of FIG. 2.
Figure 4:
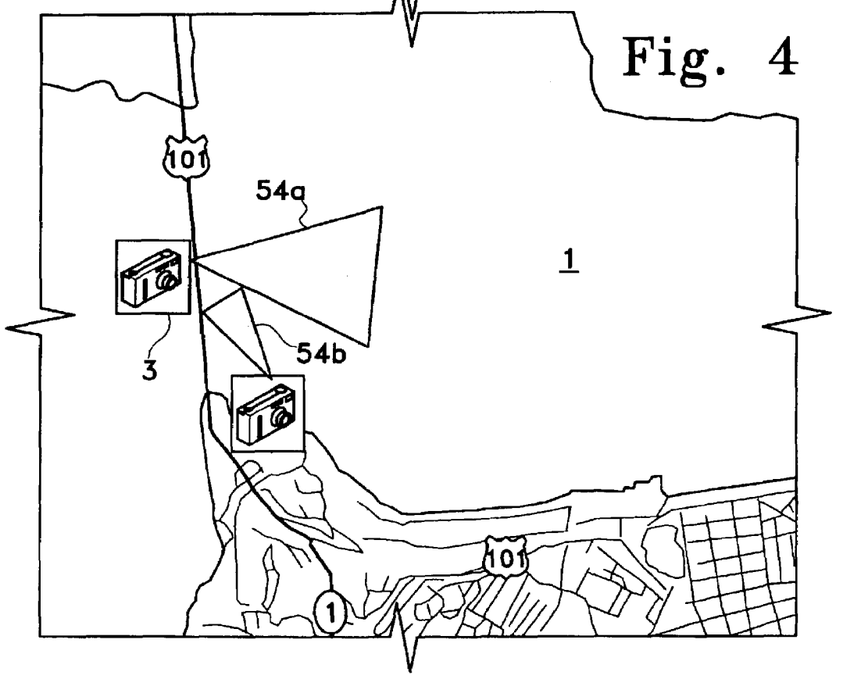
FIG. 4 illustrates a variation of FIG. 3 in another exemplary application of "path enhanced multimedia" which is supplemented by "field-of-view" data derived from one or more auxiliary sensors included in the recorder of FIG. 2.

In one embodiment, data from auxiliary sensors 42 may be used to estimate the "field-of-view" of visual (either video or still image) sensor 34 at the time of visual media capture. The field-of-view of the visual sensor describes the region of space, either in 3D coordinates or in the 2D coordinates of some map, that is visible to the camera sensor. As shown in FIG. 3, this data can be shown symbolically on map 1 by appending an arrow to multimedia icon 5, with the direction of the arrow indicating the compass heading of the camera, and the length of the arrow indicating its approximate focus. For example, a long arrow 52a can indicate a distant setting in which the camera was focused on a distant object, while a short arrow 52b could indicate a close-up setting in which the camera was focused on a nearby object. Alternatively, as shown in FIG. 4, the arrow 52a, 52b could be replaced with a triangle, thereby providing means for representing a third data item from auxiliary sensor 42, such as magnification or zoom setting. Thus, the relatively long and wide triangle 54a indicates not only compass heading (via the triangle's angular orientation) and a relatively long focal distance (via its length), but also a wider field of view and lower effective magnification (via its width), while the relatively short and narrow triangle 54b indicates the camera is focused with a narrower field of view on a closer object. By using a parallelogram instead of a triangle, it becomes possible to also indicate a fourth data item, for example the attitude of the device. If the field of view indicator is wider adjacent the recording location and becomes narrower at the maximum distance, that could indicates a downward tilt into the plane of the paper, while an increased width at greater distances could indicate an upward tilt. The average width of the parallelogram would correspond to the width of the triangle 54a, 54b, and thus would indicate the relative width of the field of view.

Reference should be made again to FIG. 2. Data specifying the estimated field-of-view may be stored in the auxiliary data sensor storage 44, together with the previously mentioned time data 24. The field-of-view of device 10 may be estimated from its position, compass heading, focal length, and imager size information, and may be refined by using camera inclination (tilt), altitude, and/or 3D land surface information if it is available. In some embodiments of the invention, the computation required for this estimation is not done by the invention itself, but instead by some other application or device after the auxiliary sensor data has been transferred off the invention as discussed below. In these embodiments, the invention stores in auxiliary sensor data storage 44 only the data required to estimate the field-of-view, such as the camera altitude, compass, inclinometer, and focal length readings at the time of capture. In other embodiments of the invention, the estimation of the camera field-of-view may be performed by the invention itself at the time of visual media capture, so that a direct description of the field-of-view, in terms of spatial coordinates, is stored in auxiliary data sensor storage 44.

One method for computing the field-of-view proceeds as follows:

a) Choose a maximum distance for subject matter with which the image capturing device is concerned. This maximum distance may be calculated from the camera focal length and aperture, or estimated from other settings, such as the "close-up" or "panorama" modes selectable in some cameras, and typically will correspond to the maximum distance at which objects will appear in focus, possibly bounded by a predetermined upper limit.

b) Project 3D rays from an assumed focal point of the device at its current location, through each of the four corners of its imager pixel array. The device orientation, focal length, pixel size, and imager pixel array size may be used to determine, via methods well known in the art of computer vision and image processing, the angles in space at which to project these four rays from the assumed focal point at the device location.

c) Truncate these rays to the distance chosen in step (a), and connect the ends of these rays with a planar rectangle to form a four-sided pyramidal volume encompassing the camera's field-of-view in 3D space. This volume may be only an approximation of the actual device field of view, since it does not take into account any obstructions created by the land surface or other objects. If the field-of-view is to be stored in the form of 3D-coordinates, it can be represented as the coordinates of the vertices of the four-sided pyramidal volume.

d) If a 2D-coordinate description of the field-of-view is desired, project this pyramidal volume straight down (where "down" means "toward the center of the Earth") onto a surface at some constant altitude relative to the Earth. In some cases, it may be desirable to use an altitude at or near that of the camera position (for instance, if the altitude is unknown, or is known to be far from sea level), but in other cases it may be preferable to use another altitude, such as sea level (i.e. zero). If local map data is available, the correct altitude to use may be selected based upon this data near the camera's capture location. In performing the vertical projection, portions of the 3D volume that lie below the selected altitude should be ignored. This projection will create a 2D shape describing the field-of-view, which may be represented as a set of 2D point coordinates, line segments, or curve segments, as appropriate.

e) If local 3D map data is available in storage on the capture device, the field-of-view computed in either steps (c) or (d) above may be further refined as follows: Divide the 2D field-of-view shape computed in step (d), or the 3D field-of-view volume computed in step (c), into a grid of discretely sampled point locations, sampled at some regular interval. Each of these grid points within the field-of-view is a 3D location with latitude, longitude, and elevation. Attempt to project a ray from the 3D camera location to each of these 3D points. If the ray from the camera extends to this point without first passing through some element of the 3D map at some other location with different (latitude, longitude) coordinates, leave the point in the grid. Otherwise, this point is obstructed by something closer to the camera, and it is removed from the grid. After testing all points in the grid, compute and store a shape description of the remaining points. This description might be the vertices of the outer hull of the points in the grid, or simply a list of all the points remaining in the grid.

For embodiments that do not compute the camera 2D or 3D field-of-view on the device itself, and instead simply store the information (such as compass, altitude, and inclinometer readings) needed to estimate the field-of-view, the above methodology may be applied by editing and display applications and systems, such as those described in referenced co-pending patent applications 10019924-1 and 100200108-1, to estimate the field-of-view for visual media from auxiliary sensor data that has been output from device 10.

In one embodiment, control is provided to recorder 10 by user mode selector 46. Control can be provided manually, by voice, or can be preprogrammed to respond to external stimuli and/or to time of day. Control via a small number of voice commands is easily implemented through use of inexpensive integrated circuits for small-vocabulary speech recognition, available from companies such as Advanced Recognition Technologies, DSP Group, and the Summa Group. Preprogrammed responses to time of day include automatic recording of video, audio, or photos at selected days and times. Preprogrammed responses to external stimuli include automatic adjustment of the video or photo exposure settings based on input from a built-in light level sensor, automatic adjustment of audio recording gain settings based on calculation of the energy level in the current audio signal, and automatic recording of video, photos, or audio in response to rapid changes in the audio or light levels. In the embodiment shown in FIG. 2, a control signal is used to control what, how, and when multimedia is recorded by means of an appropriate control signal 48 to at least sensor 34, to auxiliary sensors 42, and to path information storage 26. User mode selector 46 is used, for instance, to start and stop recording of video and audio, and is used to choose when to record a photograph. User mode selector 46 can also permit the user to specify that the multimedia data is not to be associated with path information while being recorded. The user mode selector 46 also may allow the user to select a sampling rate at which to record path information. For example, path information stored in storage 26 may be recorded ten times per second, once per second, once per minute, or only when multimedia data is being recorded. The path information sampling rate may also be set to an "adaptive" mode, in which the sampling rate is increased when the recorder 10 is moving, but is low when the device is relatively stationary. Mode selector 46 preferably also enables the user to selectively record other optional auxiliary sensor data (obtained from sensors 42), such as elevation, compass heading, tilt, focal length/zoom settings, and camera field-of-view.

In some embodiments, user mode selector 46 allows the user to select certain privacy options, including encryption and password protection of the output data 38, and/or disabling of the continuous path recording. User mode selector 46 also preferably provides the ability to bookmark certain multimedia files or path segments as belonging to one or more categories such as "favorite", "private", "public, "incomplete", and/or "trash", which may be used to facilitate subsequent editing or sharing of the recorded multimedia, or even to organize the "path-enhanced" multimedia into different views of the same trip, as described in more detail in the referenced co-pending application 10019924-1.

Recorder 10 preferably addresses privacy concerns in two ways. First, in addition to permitting the user to decide what multimedia data to record, user mode selector 46 preferably gives the user the option to determine if and when any path information is to be recorded and/or associated with the recorded multimedia data (as stated above). Second, recorder mode selector 46 may employ password-enabled encryption and access technology to restrict access to some (e.g. only certain identified path segments) or all of the 'path enhanced' multimedia data (either the multimedia data, the path data, or both), with device and/or user identification numbers being associated with different segments or categories of the "path-enhanced" multimedia data to provide enhanced privacy and limited access, especially if the "path-enhanced" multimedia data is encrypted. In at least one contemplated embodiment, the user mode selector 46 provides the user with the means to mark certain locations or path segments and their associated multimedia files (or designated portions thereof) at the time of recording as being either "public" or "private" (and/or as belonging to other designated categories), thus greatly facilitating privacy control in subsequent distribution of the data to others and in subsequent viewing and editing of the data by others.

It should be noted that the elements of the recorder 10 can be implemented in a variety of manners. Integrated circuit technology for GPS receiver 16, as well as integrated circuit technology for sensor 34 (e.g., digital still camera, digital video camera, and digital microphone), is already in an advanced state of development, and it is currently possible to use relatively small and efficient off-the-shelf components to build many of the elements of recorder 10 shown in FIG. 2. However, it will be realized that other implementations of the underlying concepts will be possible, both now and in the future. For example, the digital recording components of recorder 10 may include proprietary ASIC designs built by various manufacturers, or one can take advantage of Digital Signal Processing cores specifically designed for digital media solutions. The Texas Instruments TMS320DM310 DSP chip is an example of such a chip, which includes a CCD controller as well as analog to digital converters that may be used for the audio inputs. It also provides interfaces to commonly used external storage devices such as SmartMedia cards or CompactFlash memories. There are also many manufacturers that provide CCD sensors, and an increasing number of manufacturers that provide CMOS sensors for digital cameras. Advantages of CCDs with the current state of the art include improved signal to noise ratio, and the ability to perform better than CMOS in low lighting conditions. CMOS sensors have the advantage of much cheaper price due to the use of standard fabrication techniques developed for other IC semiconductor applications, such as memory. An example of a 4 mega-pixel CCD sensor is the Sony ICX406 AQF.

Data Structures

Exemplary data structures suitable not only for recording (or at least outputting) "path-enhanced" multimedia as described above, but also for any subsequent processing and sharing as contemplated in the referenced co-pending applications, are set forth in the referenced application entitled "Indexed Database Structures and Methods for Searching Path-Enhanced Multimedia".

In the referenced exemplary data structures, an arrow "→" indicates that a field in one structure points to another structure (possibly another instance of the same structure), an asterisk "*" indicates an optional field, a pair of angled braces "< >" indicates a list of one or more structures of the same type, and a pair of curly braces "{ }" indicates a recursive reference to the same structure type. Using the nomenclature of those exemplary data structures, and paying particular attention to the portion thereof reproduced herein as FIG. 5 of the attached Drawings, the output of the above described recorder 10 includes two basic components: recorded Media-Files 100 and associated GeoTemporalAnchors 102. Each GeoTemporalAnchor 102 (identified in the Drawings simply as "Anchor") preferably includes not only a Time 104 (i.e., path time data 24), but also an optional Location 108 (path location data 22) if a reliable measurement has been obtained at the associated Time 104. Each GeoTemporalAnchor 102 may also contain fields storing various types of auxiliary sensor data that are sampled in a quasi-continuous way (similar to Time 104 and Location 108), such as Elevation 110, Orientation 112, Tilt 114, and Temperature 116. Each GeoTemporalAnchor 102 may also contain a pointer 106 to a particular MediaFile 100, although in alternative embodiments the MediaFile 100 and GeoTemporalAnchor 102 could be combined into a single object (which might exclude use of conventional file formats for the MediaFile 100), or the association could be made by means of a separate link table. Each MediaFile 100 is typically a data file representing an audio stream (for example, in MP3 format), a still image (for example, in JPEG format), or a video stream (for example, in MPEG1 format).

Figure 5:
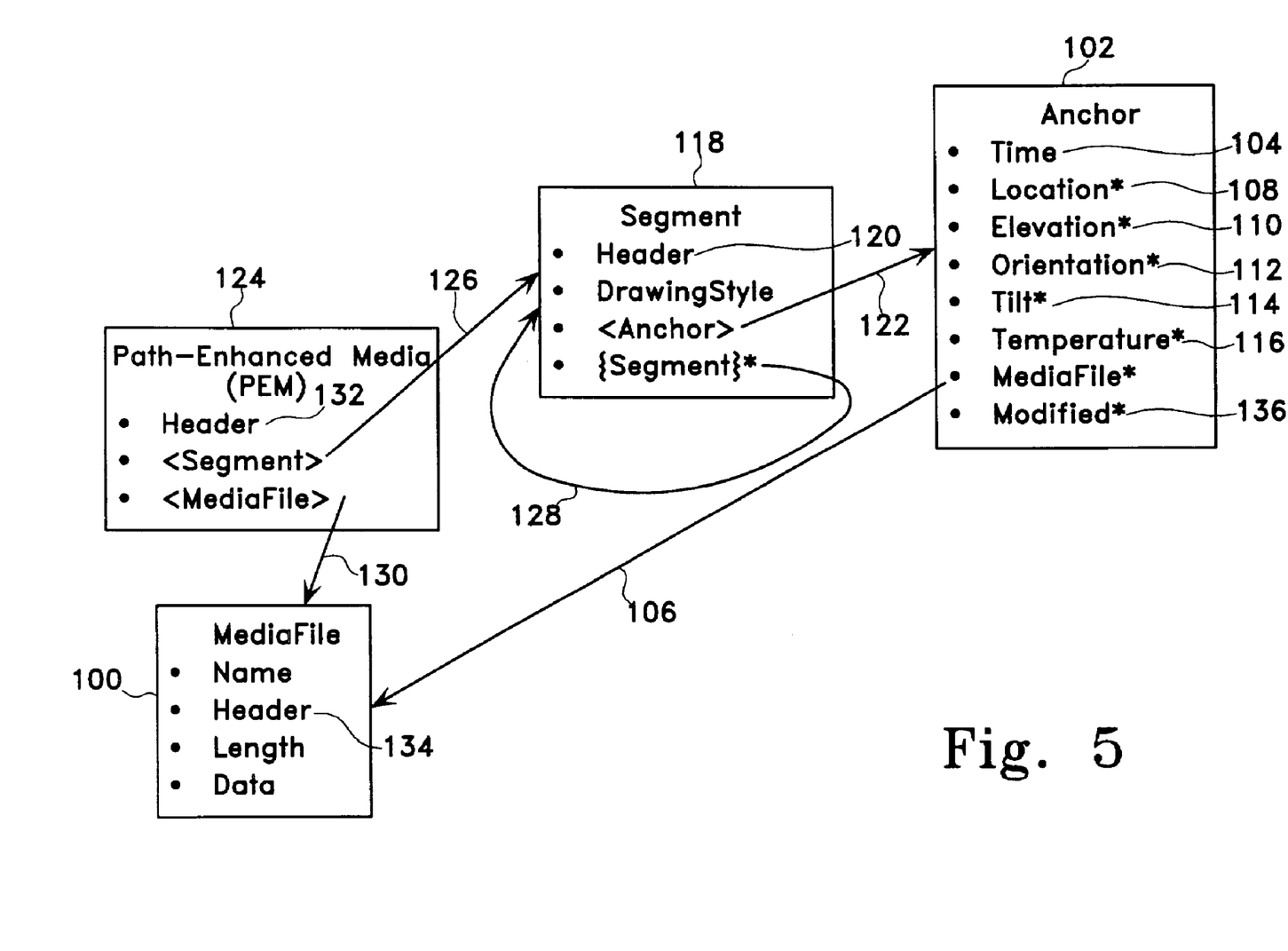
FIG. 5 shows relevant portions of an exemplary data structure layout that may be used by the "path-enhanced" multimedia recorder.

A single path may be defined by the Segment data structure 118, which contains a list of GeoTemporalAnchors 102. The Header 120 within the Segment data structure 118 also allows drawing styles, access restrictions, and other attributes (e.g. "Favorite", "Tentative", etc.) to be associated with the path. However, it is contemplated that the user may desire to associate different attributes with different parts of a path, and that several discrete paths (possibly corresponding to different trips and/or different travelers) may be recorded by the same device or otherwise included in a common data set for display, sharing, and editing. To that end, the Segment data structure 118 is preferably also capable of representing only a portion of a complete path, or just one of several discrete paths in a combined data set. As shown in FIG. 5, a sequence of several related Segments 118 (for example, portions of a single path recorded by a particular user) may be connected by a recursive {Segment} pointer 128 within the Segment data structure 118, thereby defining a sequence from one Segment to the next within a complete path. Also, different multiple such Segment sequences (possibly with different authors and/or recorded on different visits to the same place) may be included in a single Path-Enhanced Media ("PEM") meta-structure 124 by means of <Segment> list 126. The PEM need only explicitly include the first Segment 118 of each connected sequence of Segments.

Since each GeoTemporalAnchor 102 preferably includes a pointer 106 to any associated MediaFile 100, there is an indirect association between the PEM 124 and its MediaFiles 100. However, by optionally including in the PEM data structure 124 an explicit list 130 of pointers to MediaFiles associated with GeoTemporalAnchors within the Segments 126 of the PEM 124, the complete set of multimedia files associated with a PEM will be more amenable to searches and/or modifications.

The preferred hierarchical data structure also facilitates different levels of ownership and access to be associated with the different data elements. For example, different PEMs 124 may be created by different authors, or be owned by different users, or belong to different trips, as reflected in the Header 132 for each PEM. Similarly, each Segment 118 of the same PEM 124 could be part of the same trip but belong to a different user, as reflected in the respective Segment Header 120. Also, each MediaFile 100 in a particular PEM 124 could have a different owner as reflected in its associated MediaFile Header 134.

In other embodiments, especially when user privacy considerations are paramount or when the recorded multimedia data is intended to be associated with a location and time that is not the actual location and time at which the multimedia data was originally captured, it may be desirable not to record actual Times 104 and/or Locations 108 associated with a particular MediaFile 100, but only sequential reference numbers. These permit the MediaFiles 100 and any relevant information in the associated GeoTemporalAnchors 102 (or sequences of GeoTemporalAnchors 102) to be converted in subsequent offline processing into a sequence of events associated with possibly fictitious times and locations on a possibly fictitious (or "virtual") path. To that end, GeoTemporalAnchor 102 preferably includes an optional Boolean flag Modified 136 which, if set to "true", indicates that the associated GeoTemporalAnchor is not simply the raw data recorded by some time, location, and/or other sensor measurement system, but rather was created or modified after any associated sensor data was originally recorded. These "modified" GeoTemporalAnchors may be part of an entirely fictitious "virtual" path or path segment, a "reconstructed" path segment obtained by interpolating or smoothing other raw data, or an "edited" path or path segment that has been moved in time and/or location from what was originally recorded.

Thus it will be seen that a "path-enhanced" multimedia recorder is capable of recording multimedia data in a manner that facilitates subsequent path-oriented editing, presentation, and sharing of the recorded data. Other implementations and enhancements to the disclosed exemplary devices will doubtless be apparent to those skilled in the art, both today and in the future. Hence, in one embodiment the recorder 10 includes a display for viewing the "path-enhanced" multimedia data. For example, the "path-enhanced" multimedia recording device might be integrated within a portable electronic device such as a PDA or cellular phone. In this case, the "path-enhanced" multimedia data may be recorded as well as viewed, edited, and post-processed using the portable device.

The invention claimed is:

1. A recorder comprising:
    a path information determining subsystem, for determining and recording path information associated with a path traversed by the recorder at a plurality of moments in time, the path information having associated path time and location data;
    path information storage for sampling and storing the determined path information including the path time and location data;

a multimedia recording subsystem, including a multimedia storage, for recording selected multimedia data while traversing the path and associating at least a portion of the multimedia data with said path information to generate "path-enhanced" multimedia data; and adaptive control for selecting a rate at which to sample the path information dependent on the movement of the recorder.

2. The recorder of claim 1 further comprising a data transfer subsystem for transferring at least the "path enhanced" multimedia data external to the recorder.

3. The recorder of claim 1 further comprising control for prohibiting associating at least a portion of the path information with the multimedia data.

4. The recorder of claim 1 wherein its operation is controlled dependent on one of time of day and external stimuli.

5. The recorder of claim 1 wherein its operation is controlled manually or by voice.

6. The recorder of claim 1 further comprising control for allowing a user to designate into categories at least portions of one of multimedia data and path information.

7. The recorder of claim 1 comprising at least one sensor for capturing at least one type of multimedia including at least audio, video, still images, and text.

8. The recorder of claim 1 wherein the multimedia recording subsystem records more than one type of multimedia from the group including at least audio, video, still images and text.

9. The recorder of claim 1 wherein at least one multimedia type including at least audio, video, and still image is associated with the same path time and location data.

10. The recorder of claim 1 wherein the path information and multimedia data are associated by timestamping each of the location data and the multimedia data.

11. The recorder of claim 1 wherein the path information and the multimedia data are associated using pointers.

12. The recorder of claim 1 wherein the path information determining subsystem determines the path information using path-determining information from at least one external source to the recorder.

13. The recorder of claim 12 wherein path-determining information from each of the external sources is weighted dependent on accuracy.

14. The recorder of claim 12 wherein path information is determined by interpolation when path-determining information is unreliable.

15. The recorder of claim 12 further comprising a means for switching between the external sources.

16. The recorder of claim 1 further comprising at least one receiver for receiving at least one of GPS signals, additional location-determining signals, and time signals.

17. The recorder of claim 1 further comprising an accelerometer for providing data to determine spatial displacement of the recorder so as to determine path location data.

18. The recorder of claim 1 wherein the path information determination subsystem further includes means for storing path-determining information.

19. The recorder of claim 1 further comprising a clock circuit including an internal clock, wherein in response to GPS signals the clock circuit generates the path time data.

20. The recorder of claim 1 further comprising control for selecting a rate at which to sample the path information.

21. The recorder of claim 1 further comprising auxiliary sensors including at least one of a thermometer, barometer, altimeter, compass, inclinometer and accelerometer for providing auxiliary data for augmenting path information.

22. The recorder of claim 21 wherein the auxiliary data is used to estimate "field-of-view" of an image sensor including at least one of a video image sensor and a still image sensor.

23. The recorder of claim 1 further comprising a display screen and a means for rendering the "path-enhanced" multimedia data on the display screen.

24. The recorder of claim 1 implemented within a handheld device including a PDA.

25. The recorder of claim 1 implemented within a handheld device including a cellular phone.

26. The recorder of claim 1 further comprising control for restricting accessibility to at least a portion of at least one of the path information and the multimedia data by encryption.

27. The recorder of claim 1 further comprising control for restricting accessibility by allowing a user to designate into categories at least a portion of at least one of the path information and the multimedia data, wherein accessibility is dependent on the designated category.

28. The recorder of claim 27 wherein the control for restricting accessibility further comprises control for allowing a user to enter a password to obtain accessibility.

29. The recorder of claim 1 wherein the path comprises a path of movement of the recorder intermediate a starting location and an ending location, and the location data comprises information identifying a plurality of locations of the path.

30. The recorder of claim 1 wherein the "path-enhanced" multimedia data comprises a plurality of items of multimedia data, time information comprising a plurality of moments in time of capture of respective ones of the items of the multimedia data, and location information comprising a plurality of locations of the path of capture of respective ones of the items of the multimedia data.

31. The recorder of claim 30 wherein the path information determining subsystem is configured to record the path information at the moments in time comprising moments in time of a sequence.

32. The recorder of claim 30 wherein the path information determining subsystem is configured to record the path information at the moments in time comprising moments in time of a sequence and at moments in time determined according to movement of the recorder.

33. The recorder of claim 1 wherein the path information determining subsystem is configured to continuously record the path information at a plurality of moments in time while the recorder is present on the path.

34. The recorder of claim 1 wherein the path information determining subsystem is configured to record the path information at a plurality of moments in time comprising moments in time of a sequence and at intervals determined according to movement of the recorder.

35. The recorder of claim 1 further comprising a user interface configured to receive input from a user of the recorder to select multimedia data for recording, and wherein the multimedia recording subsystem is configured to record the selected multimedia data responsive to the input.

36. The recorder of claim 1 wherein the path information determining subsystem is configured to determine the path information during the traversal of the path by the recorder.

37. The recorder of claim 1 wherein the path time comprises information regarding a plurality of moments in time.

38. The recorder of claim 1 wherein the path time comprises temporal information indicative of a plurality of moments in time wherein the recorder was present at respective locations of the path of the location data.

39. The recorder of claim 1 wherein the path time comprises temporal information regarding the recording of the multimedia data.

40. The recorder of claim 39 wherein the temporal information comprises a plurality of moments in time and the location data comprises a plurality of locations of the path, and wherein the multimedia recording subsystem is configured to associate the moments in time with respective contents of the multimedia data recorded at the respective moments in time and to associate the locations of the path with respective contents of the multimedia data recorded at the respective locations of the path.

41. The recorder of claim 1 further comprising a display configured to depict a map illustrating the "path-enhanced" multimedia data for a plurality of multimedia items associated with a plurality of different locations of the path.

42. A recorder comprising:
   a path information determining subsystem, for determining and recording path information associated with a path traversed by the recorder at a plurality of moments in time, the path information having associated path time and location data; and
   a multimedia recording subsystem, including a multimedia storage, for recording selected multimedia data while traversing the path and associating at least a portion of the multimedia data with said path information to generate "path-enhanced" multimedia data; and
   control for disabling one of the path information determining subsystem and the multimedia recording subsystem to allow one of path information and multimedia data to be recorded while the other is not.

43. The recorder of claim 42, wherein, whenever the recording of path information is disabled, multimedia data is associated with data that defines a sequential order in which the multimedia data is recorded.

44. The recorder of claim 42 further comprising a display device configured to depict the "path-enhanced" multimedia data.

* * * * *